R. H. BOWMAN.
PROPELLING MECHANISM.
APPLICATION FILED AUG. 15, 1907.

898,626.

Patented Sept. 15, 1908.

7 SHEETS—SHEET 1.

WITNESSES:
John T. Schrott
H. Woodard

INVENTOR
Robert Henry Bowman.

BY
Fred G. Dieterich & Co.
ATTORNEYS.

R. H. BOWMAN.
PROPELLING MECHANISM.
APPLICATION FILED AUG. 15, 1907.
898,626.
Patented Sept. 15, 1908.
7 SHEETS—SHEET 2.
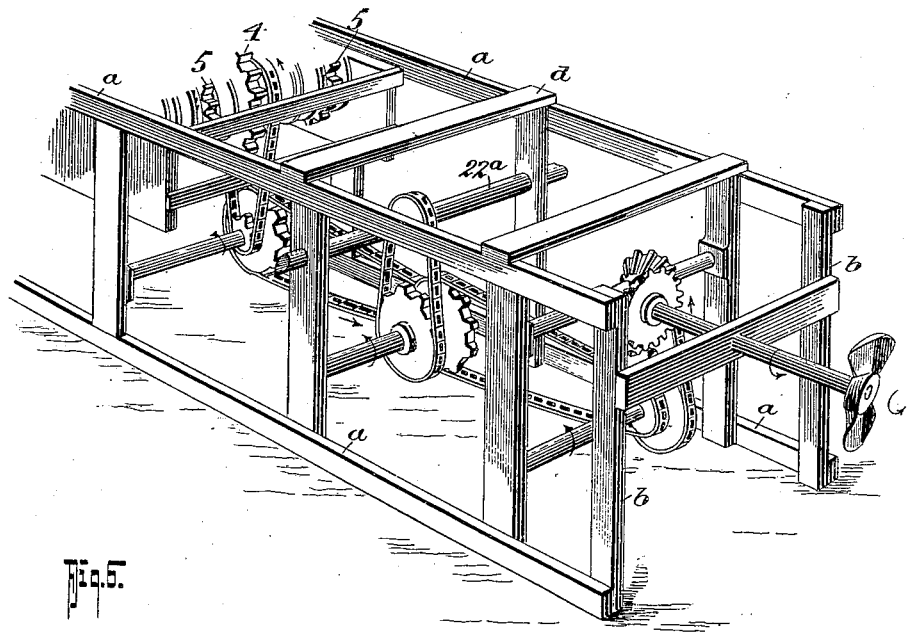
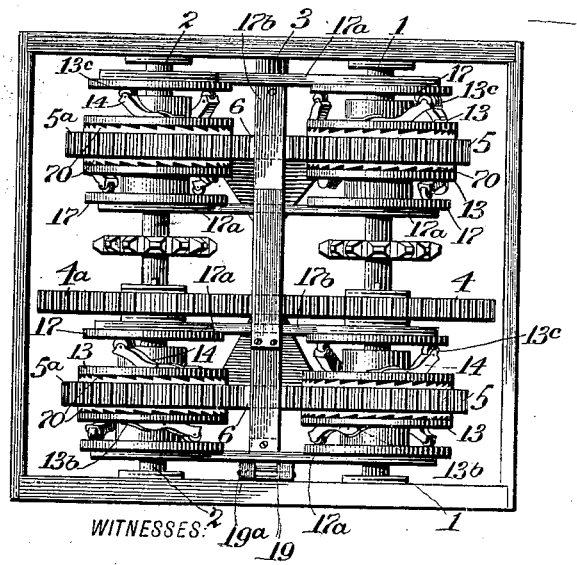
WITNESSES:
John T. Schrott
H. Woodard
INVENTOR
Robert Henry Bowman.
BY
Fred G. Dieterich & Co.
ATTORNEYS.

R. H. BOWMAN.
PROPELLING MECHANISM.
APPLICATION FILED AUG. 15, 1907.
898,626.
Patented Sept. 15, 1908.
7 SHEETS—SHEET 3.
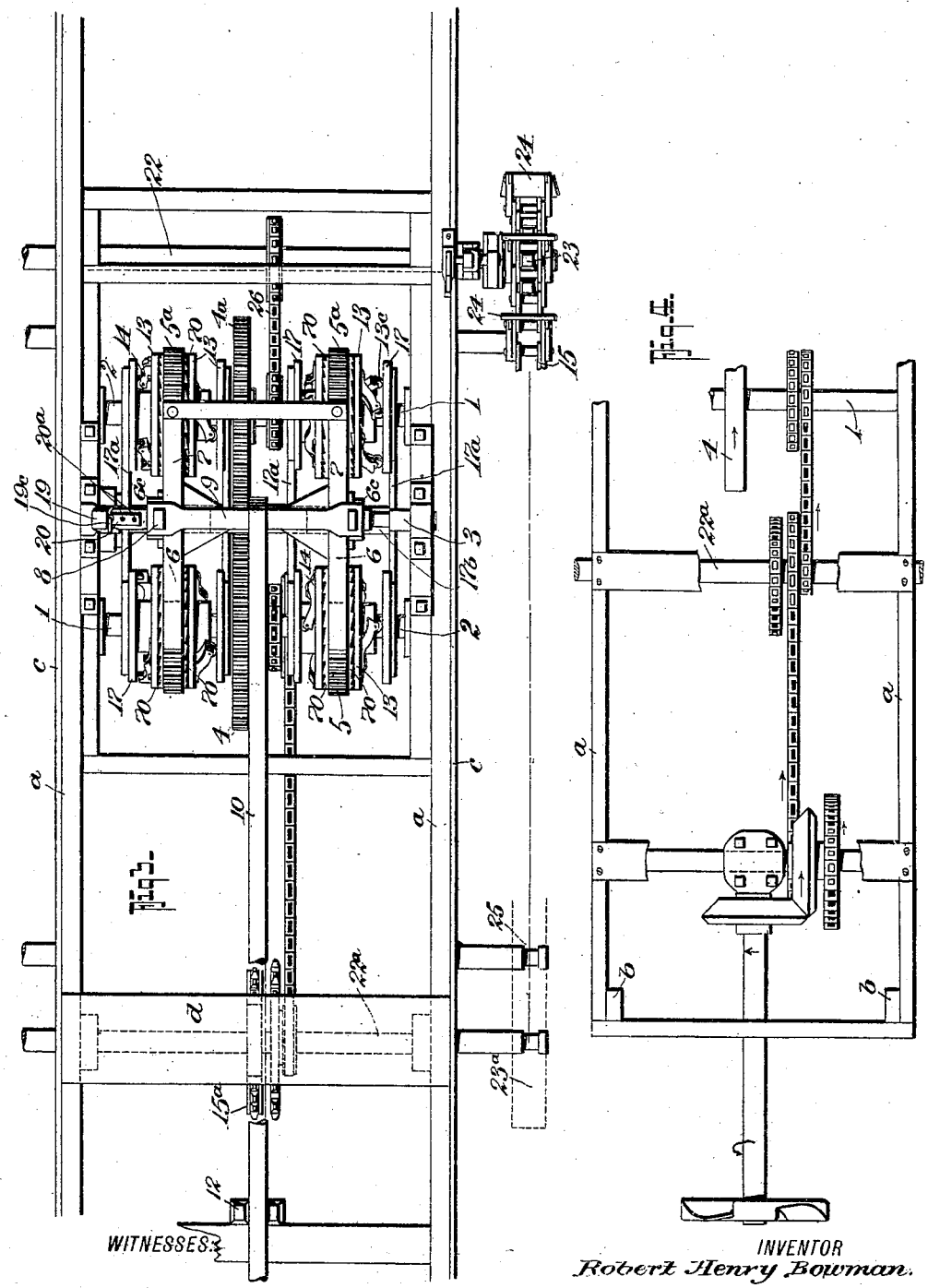
WITNESSES:
John T. Schrott
H. Woodard.
INVENTOR
Robert Henry Bowman.
BY
Fred G. Dieterich
ATTORNEYS.

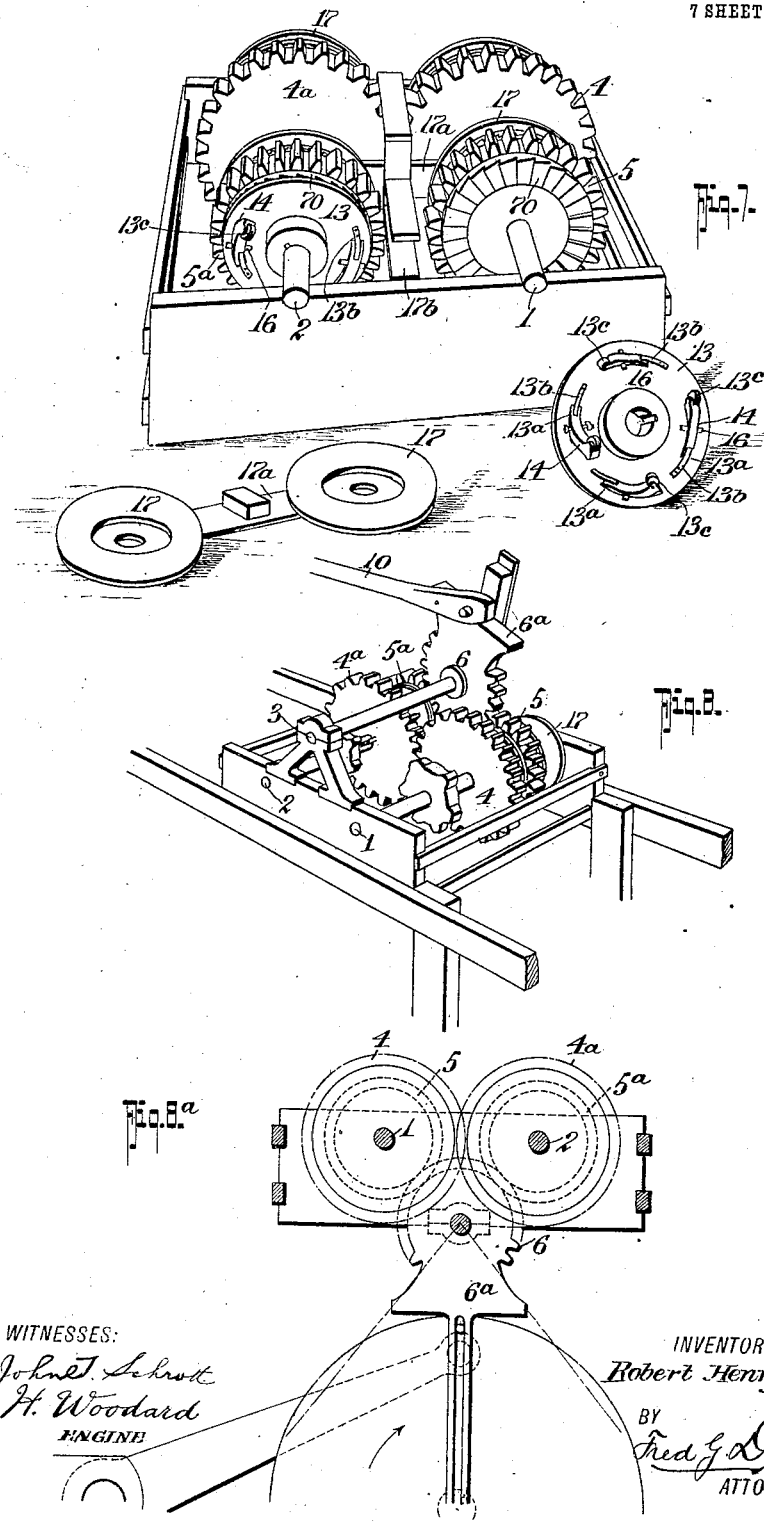

R. H. BOWMAN.
PROPELLING MECHANISM.
APPLICATION FILED AUG. 15, 1907.
898,626.
Patented Sept. 15, 1908.
7 SHEETS—SHEET 5.
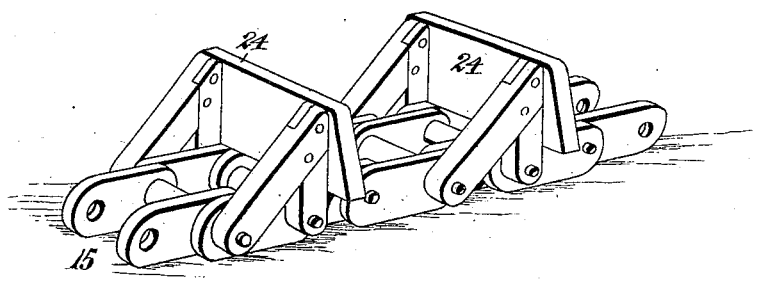
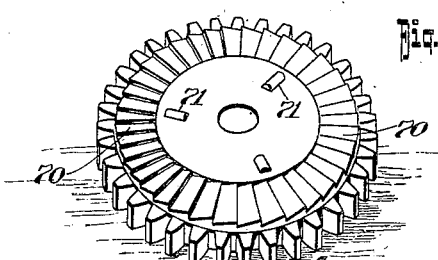
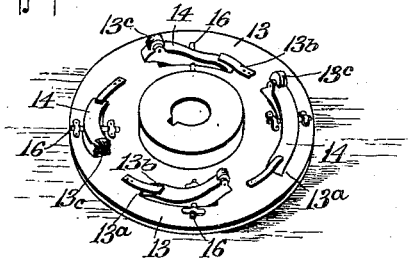
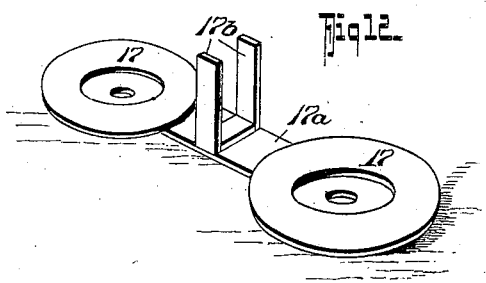
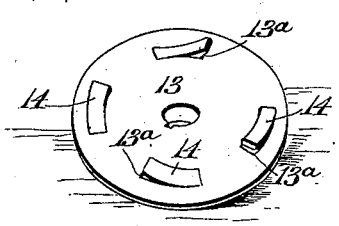
WITNESSES:
John T. Schrott
H. Woodard
INVENTOR
Robert Henry Bowman.
BY
Fred G. Dieterich & Co.
ATTORNEYS.

R. H. BOWMAN.
PROPELLING MECHANISM.
APPLICATION FILED AUG. 15, 1907.
898,626.
Patented Sept. 15, 1908.
7 SHEETS—SHEET 6.
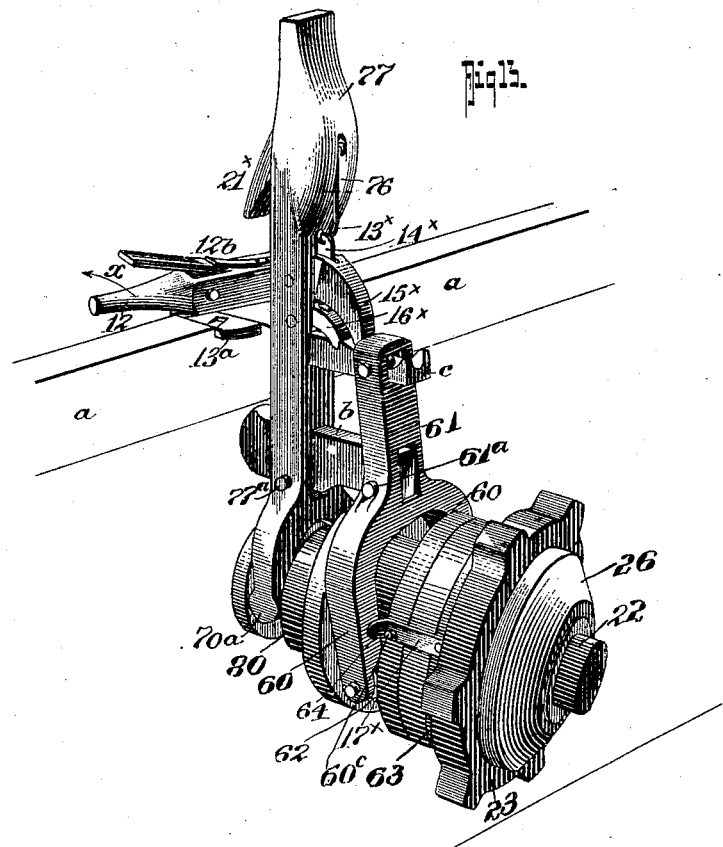
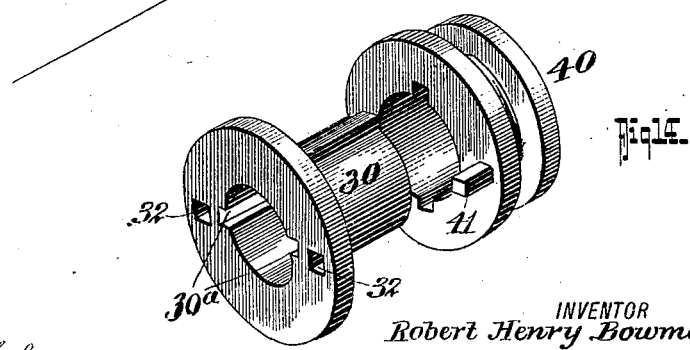
WITNESSES:
John T. Schrott
H. Woodard
INVENTOR
Robert Henry Bowman.
BY
Fred G. Dieterich
ATTORNEYS.

R. H. BOWMAN.
PROPELLING MECHANISM.
APPLICATION FILED AUG. 15, 1907.

898,626.

Patented Sept. 15, 1908.
7 SHEETS—SHEET 7.

WITNESSES:
John T. Schrott
H. Woodard

INVENTOR
Robert Henry Bowman
BY
Fred G. Dieterich & Co.
ATTORNEYS

UNITED STATES PATENT OFFICE.

ROBERT HENRY BOWMAN, OF CANON CITY, COLORADO.

PROPELLING MECHANISM.

No. 898,626.  Specification of Letters Patent.  Patented Sept. 15, 1908.

Application filed August 15, 1907. Serial No. 388,627.

*To all whom it may concern:*

Be it known that I, ROBERT HENRY BOWMAN, residing at Canon City, in the county of Fremont and State of Colorado, have invented a new and Improved Propelling Mechanism, of which the following is a specification.

This invention, which generally relates to manually operated vehicle propelling mechanisms, primarily has for its object to provide a simple and compact means, more especially adapted for propelling boats, and it comprehends generally an improved construction of parts, so designed and combined whereby a regular and smooth continuous rotary motion is acquired by means of reciprocally actuated hand lever devices, and without the necessity of using fly wheels or like power balancing devices.

Figure 1:
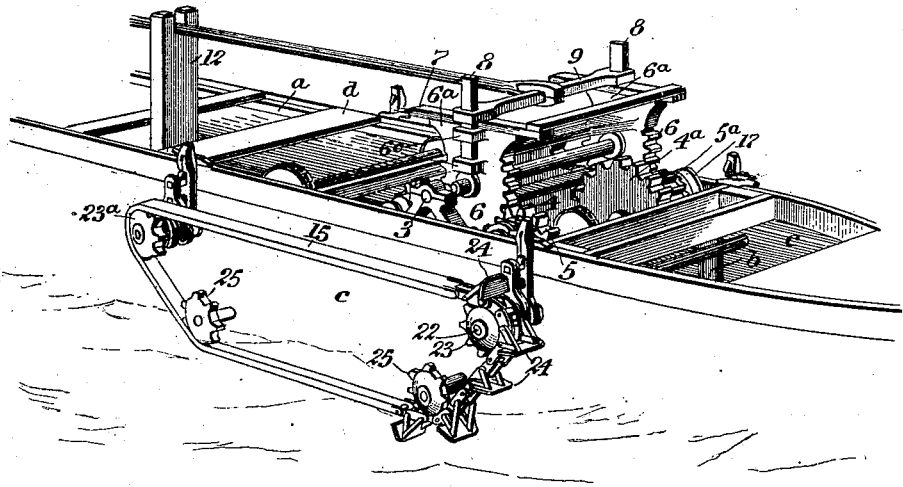
Figure 5:
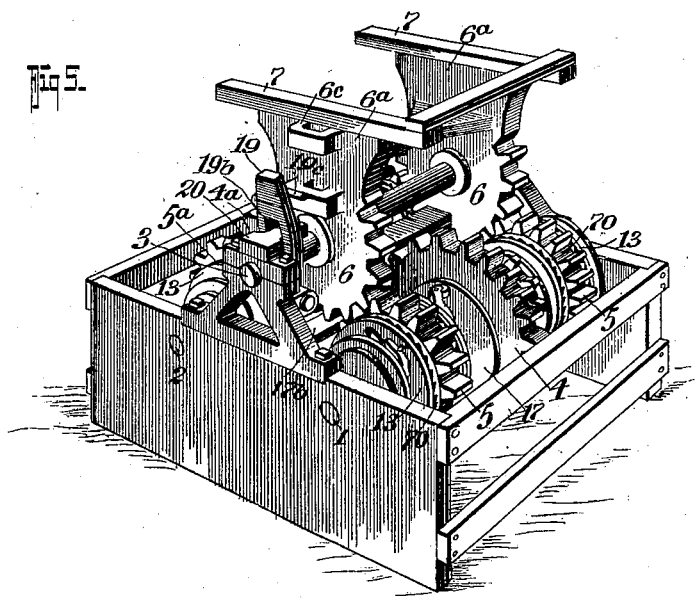
Figure 15:
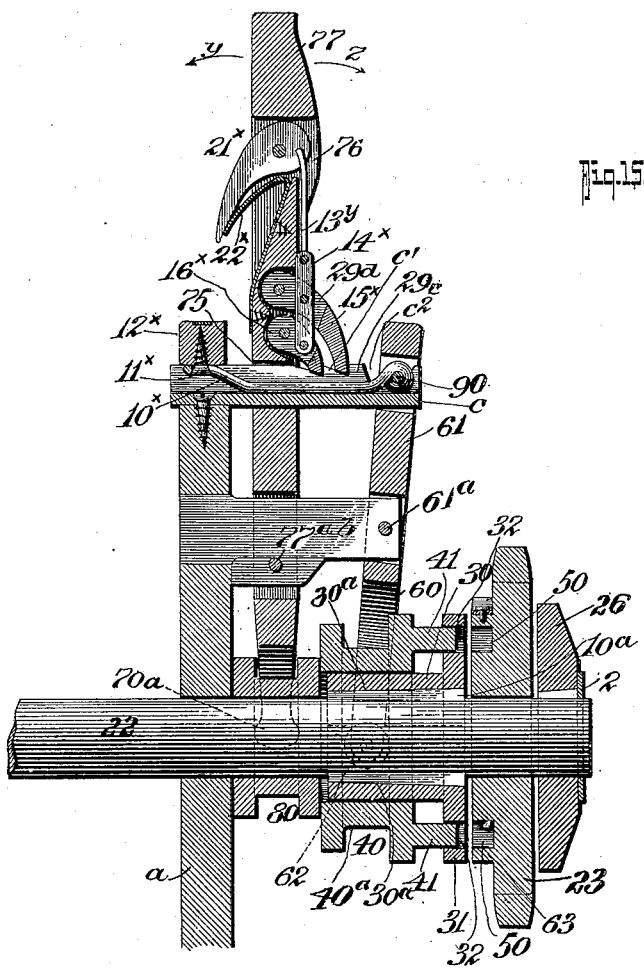
Figure 16:
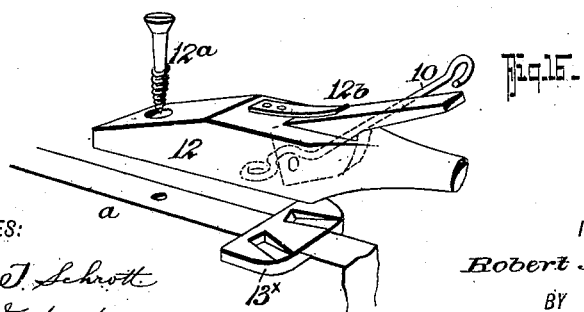

In its subordinate features, my invention consists in certain details of construction and novel combination of parts, all of which will be hereinafter fully described, specifically pointed out in the appended claims and illustrated in the accompanying drawings, in which, Figure 1, is a perspective view of my propelling mechanism, the several lever actuated ratchet gears being shown coupled together to act in unison, the parts being viewed from the front end of the supporting framing and the actuating means arranged for driving side paddles mounted on endless sprocket chains. Fig. 1ª, is a detail view of a portion of the paddle equipped sprocket chain shown in Fig. 1. Fig. 2, is a perspective view of the propelling mechanism viewed from the rear end of the supporting frame, and shown as arranged as a speeding means for driving a stern projected propeller. Fig. 3, is a plan view of the mechanism as shown in Fig. 1. Fig. 4, is a similar view of the mechanism arranged as in Fig. 2. Fig. 5, is a perspective view of the propelling means, the manually actuated rocking power applying gears being shown arranged for independent and alternate movement. Fig. 6, is an inverted plan view of the parts shown in Fig. 5. Fig. 7, is a perspective view of the motor or propeller mechanism, the top or hand controlled levers being omitted, one reverse plate and one pawl carrying plate, and the yoke connection for the reverse plates being shown as disconnected. Fig. 8, is a perspective view of a simple form of my propelling mechanism, the same having but a single actuating lever equipped gear. Fig. 8ª, is a longitudinal section of the parts shown in Fig. 8, the single actuating lever gear construction having a pendent arm for connection with a gasolene or electric driving means. Fig. 9, is a detail view of one of the main power transmitting gears having the peripheral ratchet face and the side rollers. Fig. 10, is a detail view of one of the pawl bearing disks showing the pawls on the inner face. Fig. 11, is a view of another pawl bearing disk viewed from the outer side. Fig. 12, is a detail perspective view of one of the yoke frames hereinafter described. Fig. 13, is a perspective view of a key mechanism which is used for each of the power shafts to key the power propelling wheels to the shafts. Fig. 14, is a detail perspective view of the sliding clutch members 30 and 40 hereinafter referred to. Fig. 15, is a longitudinal section of the mechanism shown in Fig. 13 and, Fig. 16, is a detail perspective view of the latch lever 12, hereinafter specified.

While I have shown and shall hereinafter specifically describe my motor or hand propelled power mechanism as especially adapted for driving small boats, I desire it understood that the same may be readily utilized for driving other craft or vehicles, or such light machinery operable from a rotary motion, which, in the use of my invention, is acquired by an improved means that transforms oscillatory motion into rotary motion by means of ratchet and pawl devices, in my construction, capable of being set to change the direction of rotation.

In carrying out my invention, the motor or power transmitting mechanism is mounted upon a suitable frame work which may form a part of the boat or other vehicle to which my invention may be applied or may be in the nature of a framing capable of being mounted within the boat or vehicle after the lever actuated mechanisms have been coöperatively positioned on the said framing.

By referring now more particularly to Figs. 1 and 3 which show my invention more especially adapted for driving side paddles for boats, the supporting frame comprises generally four longitudinal beams $a$—$a$ braced by vertical beams $b$—$b$, the latter forming the bearings for the several drive shafts hereinafter referred to. In the construction shown in said Figs. 1 and 3 side timbers $c$—$c$ are also shown, which may be a part of the frame or represent portions of the sides of the boat. On the front end of the framing are mounted in triangular relation, three transverse shafts designated 1, 2 and 3, of which shafts 1 and 2 are disposed in the same horizontal plane and shaft 3 intermediate the shafts 1 and 2 and in a plane above them. Each of the lower shafts 1 and 2 carries a large and centrally disposed gear 4—4$^a$ keyed on their respective shafts and held in mesh with each other. On each shaft 1 and 2 and on each side of the large gears 4—4$^a$ are loosely mounted smaller gears 5—5$^a$, each opposing pair of which meshes with a third gear 6 mounted loosely on the upper or central shaft 3. The two gears 6—6 on the upper shaft form the lever or actuating gears and each is formed with an upwardly projected member 6$^a$—6$^a$, to each of which is fixedly secured a longitudinally extended and horizontally disposed lever arm 7—7, the ends of which project to form handles, whereby when desired, the lever gears may be readily oscillated by an up and down lever movement. Each of the members 6$^a$ is also provided with sockets 6$^c$—6$^c$ on the sides to receive the vertically projected levers 8—8, the upper ends forming handles whereby the lever gears 6—6 may be actuated by a backward and forward oscillation, it being understood that said gears 6—6 may be oscillated alternately by moving the levers 8 independently.

In the arrangement shown in Figs. 1 and 3, I have provided for oscillating the gears 6 together and in the same direction, by connecting the levers 8—8 by a cross member 9, to which is connected a single rearwardly extended rod 10, upon which may be secured one or more cross handles so disposed that an operator or operators on the cross members or seats $d$—$d$ of the framing may readily grasp them to reciprocate the said rod 10 and thereby impart the required oscillation to the lever gears 6. When the rod is of some length a guide 12 as shown may be provided therefor.

While I have shown two sets of triple gears in the arrangement shown in Figs. 1 and 3, a greater number may be used, or but a single set may be employed as shown in Figs. 7 and 8.

The two large gears 4—4$^a$ furnish the rotating power to the several shafts or drive axles hereinafter referred to, and which carry sprocket, bevel or band wheels for running machinery of different kinds, and since the several actuating gear levers 6—6 may be worked independently or all together it follows when working all at the same time they practically work out all lost motion of the ratchet disks 13 (presently described) as one or the other of the ratchets would have hold of its coacting disk or gear all the time, and since no centering is required in my mechanism the same at all times runs smoothly without the necessity of using a fly wheel.

Each of the lever gear actuated gears 5—5$^a$ have ratchet teeth 70 on both sides near their peripheral edges, which teeth on the two opposing gears 5—5$^a$ of each set of said gears are cut reverse of each other whereby uniform rotation to the shafts 1 and 2 is effected by the oscillation of the gears 6—6. On each side of the gears 5—5$^a$ are disks 13 that carry pawls 14 that engage the ratchet faces of the gears 5—5$^a$, rollers 71 being provided in the faces of the gears 5—5$^a$ to present a smooth riding surface for the disks 13, see Fig. 9. The disks 13 are keyed to the shafts 1 and 2, and their pawls are arranged to coöperate with the disk gears 5—5$^a$ in such manner that when the lever gears 6—6 are moved back and forth intermittent direct motion is imparted to the shafts 1 and 2 and the desired direction of shafts 1 and 2 is maintained at all times, it being understood that as one set of pawls on one disk is engaging and moving the ratchet gear 7 on one drive shaft the ratchets on the other disk are slipping over the ratchet teeth on the other drive gear 7.

The several pawls 14 are annularly disposed on the disks 13 and are centrally pivoted on bolts 16, their front or teeth engaging ends being projected through slots 13$^a$ in the disk and held to such position by the springs 13$^b$. The heel portion of each pawl carries a roller 13$^c$ that engages and rides against smooth disks 17 loosely mounted on the shafts 1 and 2 and connected by a yoke piece 17$^a$ which has a central pair of inwardly projected bracket members 17$^b$ to which connects the lower end of a shifting lever 19 fulcrumed at 19$^a$ on the framing and having its upper end extended for being conveniently moved backward or forward in the longitudinal direction of the shaft 3, it having a slot 19$^b$ for the passage of said shaft. By moving the said lever 19 in the directions stated the pawl disks may be adjusted into or out of an operative position with the gears 5—5$^a$.

20 designates a latch member fastened to the frame or boxing, that projects over shaft 3 and through the slot 19$^a$, and it has three apertures 20$^a$ through either of which a slip bolt 19$^c$ on the lever can be adjusted whereby when fitted in the outermost one of the apertures 20$^a$ the lever is locked to hold the pawl disk in action, when in the central aperture, it will hold the pawls out of action.

By reason of the lever 19, the disk plates 17 can be pressed against the heel ends of the ratchet engaging pawls and thereby throw the front end of said pawls out of engagement with the ratchet teeth or gears 5$^a$.

By referring now more particularly to Figs. 3 or 6 it will be seen that a set of pawl carrying disks 13 are disposed on each side of the ratchet gears 5—5$^a$, whose opposite sides are provided with ratchet teeth, cut in reverse direction, and since two sets of disks 17 are also used, both connected to and actuated by the yoke piece 17ª, it follows that by holding the lever locked on the middle aperture in the member 20 both pawl disks will be held out of engagement, whereas adjustment of the lever with either of the other apertures or members will move one or the other of the pawl disks in engagement with the ratchet gears and thereby provide for rotation of the drive shafts in the direction desired.

So far as described, it will be readily apparent since the shafts 1 and 2 are caused to move continuously in the direction desired during the oscillation of the gear levers 8, it follows that suitable sprocket and chain connection with the desired shaft or axle to be driven is all that is necessary to complete the train of power transmission means.

When my invention is utilized as shown in Figs. 1 and 3, the endless chain of paddles are driven by a power shaft 22 mounted in the framing in front of the motor mechanism and another power shaft 22ª located preferably nearly midway of the boat. Each of the said shafts 22 and 22ª carry sprocket wheels 23—23ª, over which the endless chains 15—15ª pass, and which also take over a pair of lower or guide sprocket wheels 25—25 loosely mounted on the stud shafts and which form, as it were, idlers. The front power shaft 22 is driven by sprocket wheel and chain connections 26 that join said shaft with the motor drive shaft 1 and the rear power shaft 22ª is similarly joined with the drive shaft 2, as shown. By thus joining the motor with the front and rear power shafts, a uniform steady and direct motion is imparted to both of the said shafts.

The endless chains 15 carry paddles 24, the construction and operation of the same with the said chains is clearly shown in Fig. 1ª.

In the practical construction of my propelling mechanism, the sprocket wheels 23—23ª are loosely mounted on the ends of their respective power shafts 22—22ª and they are thrown into a fixed connection therewith by suitable clutch mechanisms, each shaft carrying an independent clutch mechanism. The several clutch mechanisms in detail are constructed and arranged similarly to the clutch mechanism shown in detail by Figs. 13, 14, 15 and 16, by reference to which, and particularly to Fig. 15, it will be seen, that the sprocket wheel 23 that is loosely mounted on its respective shaft 22 has a series of clutch sockets 50—50 on its inner face with which the clutch lugs 41, presently again referred to, are adapted for engagement.

30—40 designate two sleeves or collars, one of which 30, is slidably mounted on the shaft 22, it having key-ways 30ª—30ª for engaging the keys 10ª on the shaft, as clearly shown in Fig. 15, from which it will also be seen that the collar 30 has a friction disk 31 at its outer end for engaging with the inner face of the sprocket wheel 23, the latter being loosely mounted on the shaft 22 so it can be readily shoved into a frictional contact with the disk 26 fixedly mounted on the shaft 22, as shown. The disk members 31 each have a series of apertures 32 that register with the sockets 50 in the wheel 23 and in which extend the clutch lugs 41 that project from the outer face of a sleeve 40 rotatable with but slidably mounted on the sleeve 30 to such an extent that the lugs 41 can be shoved through the apertures 32 and into the sockets 50 in the wheel 23 as will presently more fully appear. The sleeve 40 has an annular groove 40ª that receives the bifurcated ends 60—60 of a shifting lever 61 fulcrumed at 61ª on the bracket $b$ projected from the frame $a$, the said bifurcated ends 60—60 also carrying friction rollers 62 for reducing the friction between the said ends and the sleeve 40 when the clutch carrying shaft is rotating.

77 designates a main shifting lever that is fulcrumed at 77ª on a bracket $b$, the lower end of the said lever 77 being forked as at 70ª for fitting the annular groove of another sleeve or collar 80 that is slidably and loosely mounted on the shaft 22, see Fig. 15, whose function is to move the collars 30—40 in unison after the said two collars have been primarily adjusted by the lever 61, as will more presently appear.

Projected outwardly from the upper edge of the side frame $a$ is a longitudinally grooved bracket $c$ that has ratchet teeth $c'$ and a freeway $c^2$ in which plays a cross pin 90, located in the upper end of the lever 61 and which is apertured to straddle and move freely over the outer end of the bracket $c$, it being held to rock on its fulcrum on the bracket $b$, by a rod $10^\times$ that lies on the grooved bottom of bracket $c$, see Fig. 15, and is made fast to the cross pin 90, its inner end being secured to a stud $11^\times$ pendent from the horizontally shiftable lever 12 that is fulcrumed at 12ª on the frame $a$ and is provided with a spring latch $12^b$ for engaging a ratchet plate $13^\times$ for holding the said lever to its inward or outward adjustments.

The main hand or shifting lever 77 is apertured as at 75 to fit over the ratchet bracket $c$ and it has an elongated slot 76, in which is fulcrumed a hand gripped releasing member $21^\times$ held to its outer or normal position by a spring $22^\times$. To the said member $21^\times$ is connected one end of a pendent rod $13^y$ that joins with a link $14^\times$ that pivotally connects with a pair of pawls $15^\times$—$16^\times$ that engage the ratchet teeth on bracket $c$ which normally engage with the said teeth as clearly shown in Fig. 15, such positioning of the pawls being provided for by the rigid connection that joins the pawls with the spring held member $21^{\times}$.

By reason of the construction and coöperative arrangement of parts shown and described, I have provided for an initial frictional coupling of the sprocket wheel to the shaft and a positive locking of the said wheel to the shaft, both operations of which can be independently and readily effected, since first moving the lever 77 in the direction of the arrow Y, see Fig. 15, causes the collar 80 to slide outwardly and thereby move both of the sleeves and at the same time bring the disk 31 into frictional engagement with the sprocket wheel and said wheel into engagement with the disk 26 on the end of the shaft 22. It should be understood that the lever $12^{\times}$ is first released, if necessary, before operating the lever 77 to move the sleeves to cause frictional engagement between the disks 31—26 and the sprocket 23. As the two sleeves 30 and 40 are moved outwardly by the lever 77, the sleeve 40 is moved into position to be readily forced into a locked engagement with the wheel 23, which operation is effected by swinging the lever $12^{\times}$ horizontally inwardly, which swings the lever 61 in such manner as to force the sleeve 40 further outward to move the lugs 41 into the sockets 50 in the wheel 23 as will be clearly understood by referring to Fig. 3.

To release the keying of the wheel 23 onto shaft 22 the operator presses the member $21^{\times}$ inwardly as he grasps the lever 77 which lifts the pawls from engagement with the rack member $c$ and permits of swinging the said lever in the direction of arrow $z$, thus breaking the direct frictional contact between the wheel 23, disk 31 and the disk on the outer end of the shaft, and by moving the horizontally adjustable lever $12^{\times}$ outwardly, the sleeve 40 will be swung backwardly sufficient to bring its lugs out of engagement with the sockets in the wheel 5 and thereby leave said wheel loose to freely turn on shaft 1.

For holding the several parts of the clutch devices above referred to in a positively locked engagement, that is to say, to hold the members 40 and 30 closed against each other and the member 23, a locking latch designated $17^{\times}$ may be used, in the manner shown in Fig. 13 which shows the latch $17^{\times}$ as pivotally connected to the inner hub of the member 23 and as having its notched end swung over a stud $60^{c}$ on the member 60. This extra locking means is used only for holding the clutch members positively locked and is not used in the ordinary running of the motor. The latch $17^{\times}$ is operated by hand.

By reason of arranging the main lever and the rack and the pawl devices that coöperate therewith, as shown, permits of pulling the said lever back and relieving the strain on the dogs or pawls before raising them, and furthermore, by providing the initial and secondary friction means for keying the wheel to the shaft, the said wheel can be keyed to the said shaft without sudden jars or shocks to the machinery to which power is transmitted through wheel 23 since the friction can be first gradually put on by shoving the disk 31 against the wheel 23 and the wheel 23 against the disk on the end of shaft and afterward positively locking the parts together by moving the lugs on the disk 40 into the sockets 50 in the wheel 23.

The paddles on the paddle carrying chains are placed at suitable intervals and are attached by links to the bolts forming the chain, as clearly shown in Fig. $1^{a}$.

Briefly recited, by reason of the correlation of the lever ratchet wheels 6—6 with the other parts, which is such that when the ratchet wheels are rocked back and forth the pawls engage with the ratchets on the power transmitting gears 5 and thereby turn the shafts 1 and 2 in uniform direction, the pawls slipping over the ratchet teeth of one of the gears 5 when the handles of gears 6 are rocked back, and imparting movement forward to the other gear $5^{a}$, thus giving a continuous rotary motion, that is, a rotary motion transferred from a direct motion into a direct rotary motion.

By suitably setting the lever that connects with the yoke plates that act on the pawl carrying disks, the said yoke can be easily set to press equally against the backs of the pawls, thereby moving them halfway or beyond the ratchet teeth thereby throwing them all out of action.

When my power mechanism is utilized for propelling the side paddles, as shown in Fig. 1, by reason of the several paddle chain actuated shafts, each being equipped with an independent clutch mechanism, and gearing them with the power shafts 1 and 2 as stated, it is manifest that when the direction of motion of the shafts 1 and 2 is reversed, similar movement is imparted to the paddle chain shafts, or to the propeller as the case might be, and in case of adjusting the clutch for throwing off the sprocket wheel for the paddle carrier on the rear carrier power shaft on one side and the same on the front shaft on the opposite side the other power carrying wheels on the front and rear shafts remaining in active position. Now, since the shafts 1 and 2 of the motor devices turn opposite each other, it follows that opposite motion is imparted to the endless paddle carrying chains on the opposite sides of the boat, and as one of said paddle chain shafts now turns forward and the other backward causes the boat to turn around as on a pivot, it being understood the direction of rotation of the boat can be determined by proper adjustment of the clutch devices on the several shafts.

While I have described and illustrated the clutch mechanisms for locking the several sprocket wheels on their respective shafts, the said mechanisms form no specific part of this invention since the same is fully disclosed in my Patent No. 876,318, dated January 14, 1908.

Having thus described my invention, what I claim, is:

1. A propelling mechanism comprising a suitable frame, a pair of power transmitting shafts having direct gear connection with each other, a driven shaft geared with each of the transmitting shafts, and means for alternately maintaining direct motion to the said transmitting shafts, each of said means including a ratchet faced gear loosely mounted on the shaft, clutch pawls carried on the shafts normally out of engagement with the ratchet faced gear, and a lever operated means on each shaft for shifting the clutches into operative engagement with the ratchet faced gear on the transmitting shafts alternately.

2. In combination with a suitable supporting frame, a pair of power transmission shafts and a power shaft journaled in the said frame, of a clutch mechanism on each of the transmission shafts, an actuating mechanism on the power shaft coupled with the two clutch mechanisms adapted for adjustments to the clutch mechanisms alternately, and means for throwing the clutch mechanisms out of operation whereby to provide for imparting movements to the transmission shafts from the power shafts in opposite directions, and mechanism coupled to the transmission shafts to be actuated therefrom.

3. A mechanism for the purposes stated, that comprises the following elements in combination; a suitable framing, a pair of power transmission shafts mounted thereon, a driven shaft coupled with each transmission shaft, the two transmission shafts being directly geared with each other, a ratchet faced gear loosely mounted on each transmission shaft, a clutch disk fixedly mounted on each transmission shaft, said disks coöperating with the ratchet faced gears, a means for adjusting the ratchet faced gears into and out of active position, and an oscillatory hand controlled gear that meshes with the two ratchet faced gears loosely mounted on the transmission shaft.

4. A mechanism of the class described, which comprises in combination with a framing, a pair of transmission shafts mounted thereon, and a drive shaft coupled with each transmission shaft, said transmission shafts being directly geared with each other; of a ratchet faced gear loosely mounted on each transmission shaft, said gears having ratchet portions on each of their opposite faces, clutch disks mounted on each transmission shaft and disposed on the opposite sides of the ratchet gears, said disks having pawls for engaging with the ratchet portions of said ratchet gears, an oscillating hand operated gear that meshes with the ratchet gears for imparting alternate reverse motion to the said gears, and means mounted on the frame for shifting the clutch disks to bring their pawls into alternate engagement with the opposite sides of the ratchet gears and to release the said clutch disks from the said gears.

5. In a mechanism of the class described, the combination with the framing, a pair of transmission shafts mounted thereon, a driven shaft coupled with the transmission shaft, said transmission shafts being directly geared with each other, of a ratchet faced gear loosely mounted on each transmission shaft, a clutch disk loosely mounted on each transmission shaft to turn therewith, a means for adjusting the clutch disks into and out of active position, an oscillatable gear held in mesh with both of the ratchet faced gears, said oscillatable gear having means combined therewith for actuating it.

6. In a mechanism for the purposes stated, the combination with a framing, a pair of transmission shafts mounted thereon, a driven shaft coupled with each of the said transmission shafts, said transmission shafts being directly geared to each other, a clutch gear loosely mounted on each of the transmission shafts, a clutch disk on each shaft for engaging and interlocking with the loosely mounted gears, and lever mechanism mounted on the frame for adjusting the said clutch disks; of a third shaft mounted on the frame and disposed centrally over the two transmission shafts, a gear fixedly mounted on the said shaft held in mesh with the clutch controlled gears and having horizontally disposed and vertically extended handle portions, substantially as shown and for the purposes described.

7. In a mechanism for the purposes described, the combination with a framing, the two transmission shafts mounted therein, a driven shaft connected with and actuated from each transmission shaft, said transmission shafts being directly geared with each other, a clutch mechanism on each of the transmission shafts, each of said clutch mechanisms including a gear loosely mounted on each transmission shaft, means for shifting the said clutch mechanism into and out of operative position and an oscillatory mounted gear held in mesh with the loose gears on the transmission shafts; of a chain wheel loosely mounted on each end of the driven shafts, an endless paddle equipped chain that engages the chain wheel and means for throwing either of said chain wheels into or out of a locked connection with their respective driven shafts, for the purposes specified.

8. The combination with the framing, a pair of power transmission shafts mounted thereon, a driven shaft coupled with each transmission shaft, said transmission shafts being geared with each other; of a ratchet faced gear loosely mounted upon each transmission shaft and each having their opposite faces formed with annular ratchet teeth inclined in a reverse direction, a clutch mechanism on each transmission shaft and rotatable therewith, said clutch mechanisms each including a pair of pawl carrying disks located on each side of the ratchet gear, a yoke that connects both sets of ratchet pawl carrying disks and means for shifting the yoke whereby to set the said disks into an operative or inoperative connection with the alternate faces of the ratchet gears, for the purposes specified.

9. In a mechanism of the character described, the combination with the framing, a pair of driven shafts mounted transversely on the said framing, and a hand actuated means mounted on the frame for imparting alternate rotary motions to the said driven shafts; of a chain wheel loosely mounted on each end of the two driven shafts, a paddle equipped endless carrier that takes over each set of chain wheels at each side of the frame and a clutch mechanism mounted on each end of each of the driven shafts that coöperates with the chain wheels, each of said mechanisms being independently adjustable whereby to throw either of the chain wheels into or out of a fixed connection with their respective driven shafts, for the purposes specified.

10. In a mechanism for the purposes stated, the combination with a driven shaft, and a chain wheel loosely mounted thereon; of a clutch mechanism comprising a sleeve loosely mounted upon the said shaft that carries the chain wheel, another sleeve slidably mounted upon the said shaft and having clutch members for engaging the other sleeve, a yoke that engages the sliding sleeve pivotally mounted on the framing, a rack member projected from the framing, upon which the upper end of the said yoke engages, and a lever member mounted on the driven shaft, and having a pawl for engaging with the aforesaid rack, for the purposes described.

11. In an apparatus of the character described, the combination with a shaft carrying a gear, a frame upon which the shaft is mounted rockably journaled in a supporting frame, said gear having projecting lever members for reciprocating it; of a set of transmission shafts journaled in the framing and directly geared with each other, the driven shafts mounted on the framing and coupled with the said transmission shafts, propeller mechanism also mounted on the said frame and actuated from the driven shafts, means for throwing into or out of operative condition either of the said driven shafts, clutch devices on each of the transmission shafts, said clutch devices including a clutch gear loosely mounted on each of the transmission shafts, means for shifting the clutch gears into or out of operative condition substantially as shown and described.

12. In a mechanism of the character described, the combination with a transmission shaft, a driven shaft connected therewith; of a clutch mechanism for the said shaft comprising gear wheels mounted on the said shaft and having annular ratchet rims on its opposite faces, a disk carrying a series of spring held pawls, one of said disks being mounted on the transmission shaft to turn therewith and located at each side of the ratchet gear, other disks slidably mounted on the shaft for engaging with the pawls and means for moving the disks to or from the said pawls whereby to throw them into and out of operative connection and devices for adjusting the said disks for throwing the pawl disks into or out of operative connection with the ratchet gear, all being arranged substantially as shown and described.

13. In a mechanism of the character described, the combination with the framing, the transmission shafts geared with each other, the power shafts geared with each transmission shaft, a clutch mechanism on each transmission shaft including a gear loosely mounted thereon and disk clutch members for engaging with the said gear mounted on the said shaft, and means for adjusting said clutch members into or out of operative connection; of a mutilated gear, a shaft that carries said gear mounted above the transmission gears and disposed parallel therewith, said mutilated gear having upwardly extending member, an actuating rod adjustably connected to and projected from the said member and handle members on the said rod whereby the same may be oscillated to impart rotary motion to the mutilated gear and reverse rotary motion to the transmission gears, all being arranged substantially as shown and for the purposes described.

ROBERT HENRY BOWMAN.

Witnesses:
P. H. TROUTMAN,
J. T. CORRIN.